United States Patent
Coral et al.

(10) Patent No.: US 7,954,779 B2
(45) Date of Patent: Jun. 7, 2011

(54) DEVICE FOR BALANCING AN ARM PIVOTING ABOUT AN AXIS OF ROTATION, FOR EXAMPLE, AN ARM SUPPORTING A WORK STATION ALL-PURPOSE FUME OR GAS EXHAUST CONDUIT

(75) Inventors: Luciano Coral, Leini' (IT); Pietro Bazzo, Leini' (IT)

(73) Assignee: Coral S.p.A., Leini (IT)

( * ) Notice: Subject to any disclaimer, the term of this patent is extended or adjusted under 35 U.S.C. 154(b) by 1234 days.

(21) Appl. No.: 10/515,539

(22) PCT Filed: May 23, 2003

(86) PCT No.: PCT/IT03/00318
§ 371 (c)(1), (2), (4) Date: Jun. 10, 2005

(87) PCT Pub. No.: WO03/100313
PCT Pub. Date: Dec. 4, 2003

(65) Prior Publication Data
US 2005/0252336 A1  Nov. 17, 2005

(30) Foreign Application Priority Data
May 23, 2002  (IT) .............................. TO2002A0437

(51) Int. Cl.
*E04G 3/00* (2006.01)
*B08B 15/02* (2006.01)
(52) U.S. Cl. ........... 248/280.11; 248/284.1; 248/292.13; 454/65
(58) Field of Classification Search ............... 248/276.1, 248/280.11, 292.11, 292.13, 569, 575, 592, 248/594, 284.1, 919–920; 285/114, 184, 285/148.18, 226, 168, 228, 283; 454/63, 454/65, 67
See application file for complete search history.

(56) References Cited

U.S. PATENT DOCUMENTS

| 3,930,594 A | 1/1976 | Jungmann |
| 4,082,244 A * | 4/1978 | Groff ..................... 248/280.11 |
| 4,158,462 A * | 6/1979 | Coral ......................... 285/184 |
| 4,768,762 A | 9/1988 | Lund |
| 5,281,246 A * | 1/1994 | Ray et al. ..................... 55/302 |
| 5,336,130 A * | 8/1994 | Ray .............................. 454/65 |
| 5,536,206 A * | 7/1996 | Bodmer et al. ............... 454/65 |
| 6,413,158 B1 * | 7/2002 | Coral ........................... 454/65 |
| 2002/0029878 A1 | 3/2002 | Victor |
| 2005/0252336 A1 * | 11/2005 | Coral et al. .................. 74/592 |

FOREIGN PATENT DOCUMENTS

| DE | 32 25 953 A1 | 1/1984 |
| DE | 196 06 974 A1 | 9/1996 |
| EP | 0 723 368 A2 | 7/1996 |
| FR | 974 634 | 2/1951 |
| FR | 2 379 733 A | 9/1978 |
| WO | WO-98/39112 A1 | 9/1998 |

* cited by examiner

*Primary Examiner* — Tan Le
(74) *Attorney, Agent, or Firm* — Fish & Richardson P.C.

(57) ABSTRACT

The torque, due to the weight of the arm, is balanced according to the angular position of the arm by a contrast spring acting perpendicular to the axis of rotation of the arm. The spring is controlled by a cam integral with the arm, is housed in a container closed by a wall acted on by the profile of the cam, and rests on a guide disk whose position relative to the container is adjusted by means of an adjusting screw to calibrate the precompression of the spring according to the minimum torque due to the weight of the arm. In another embodiment, at least one contrast spring acts parallel to the axis of rotation of the arm, and is controlled by a cam edge of a cylinder for axially moving a corresponding sleeve housing the spring.

9 Claims, 6 Drawing Sheets

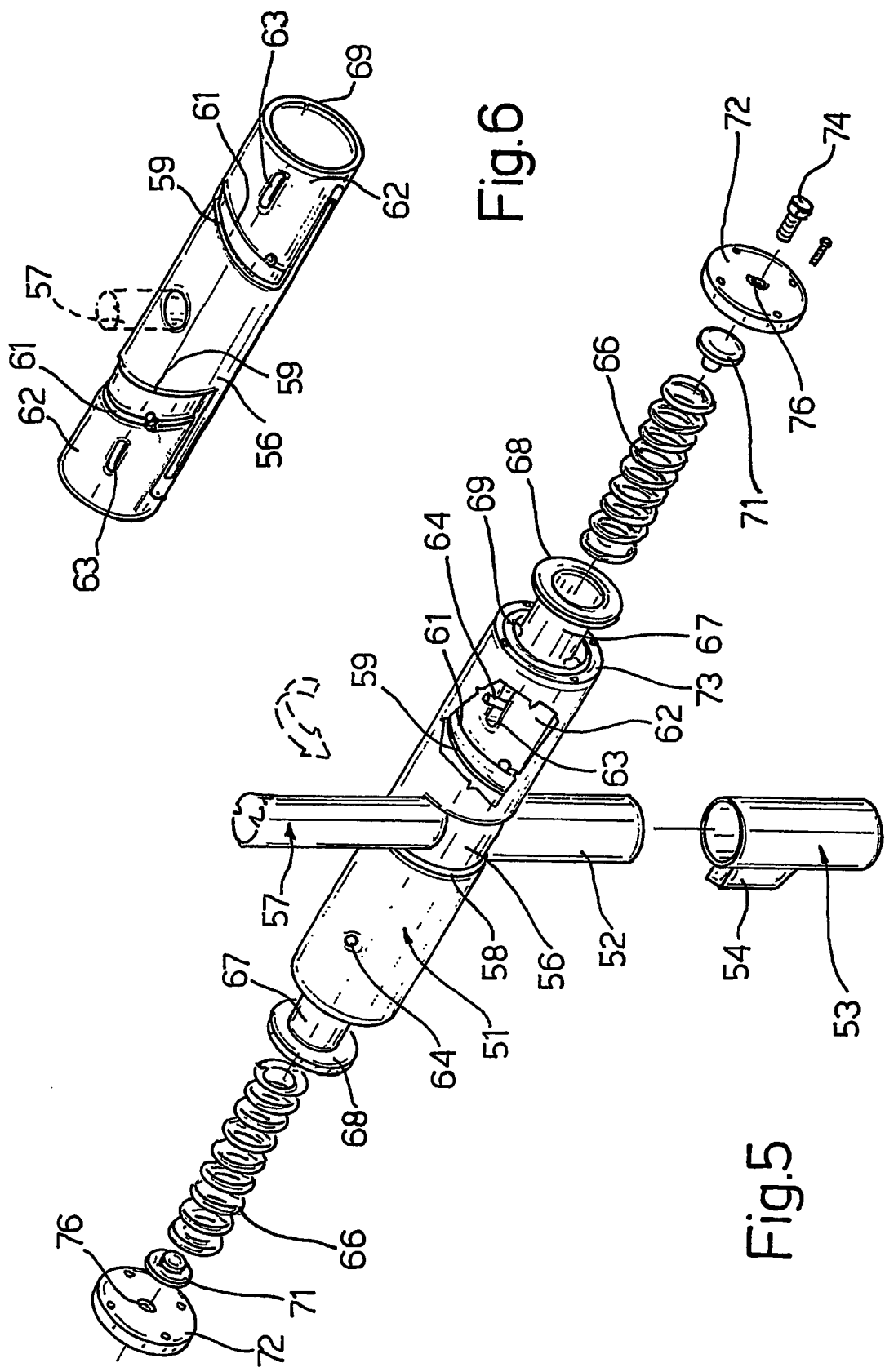

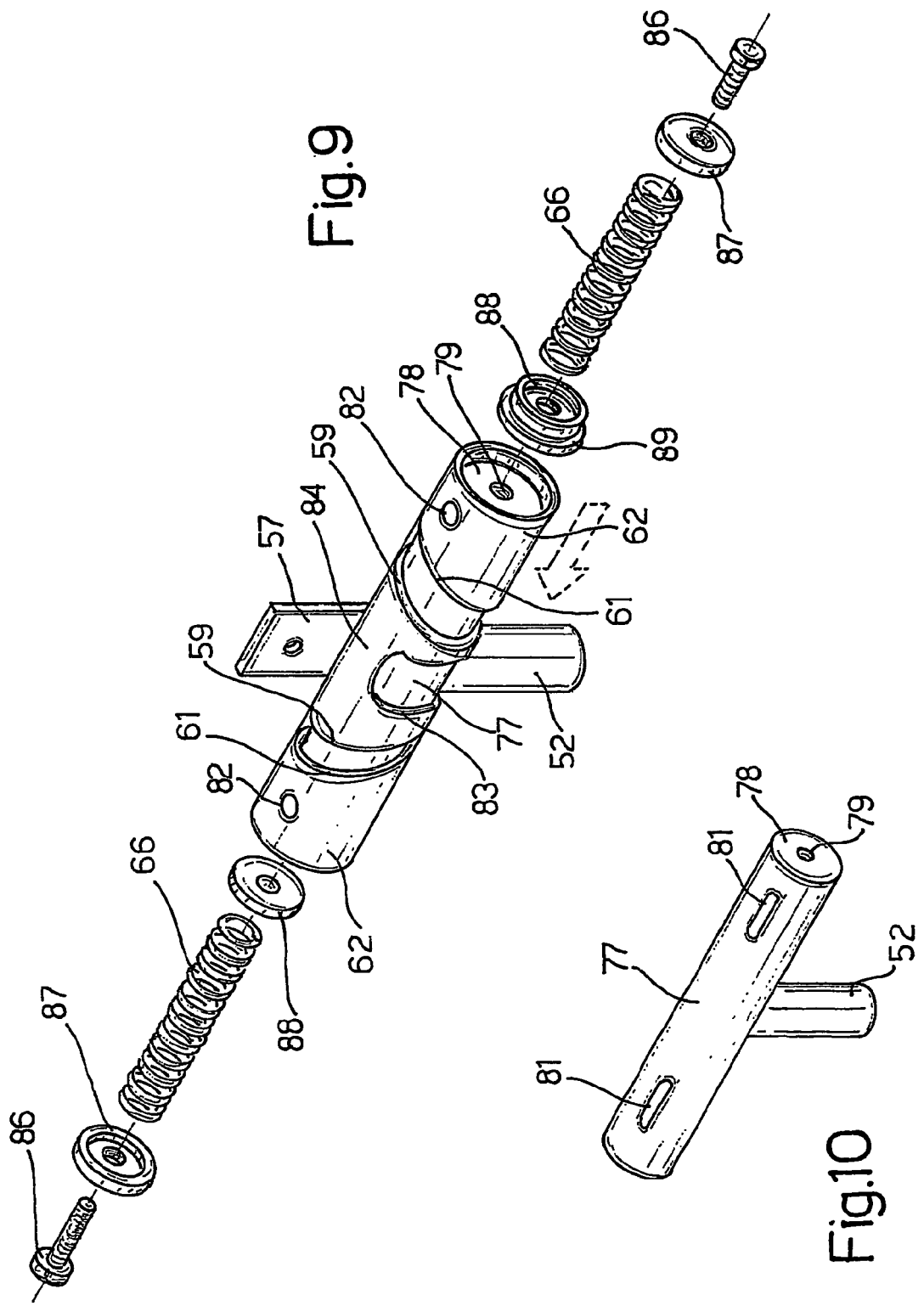

120
DEVICE FOR BALANCING AN ARM PIVOTING ABOUT AN AXIS OF ROTATION, FOR EXAMPLE, AN ARM SUPPORTING A WORK STATION ALL-PURPOSE FUME OR GAS EXHAUST CONDUIT

CROSS REFERENCE TO RELATED APPLICATIONS

This application is the 371 National Phase of International Application No. PCT/IT03/00318, filed May 23, 2003, which was published in English under PCT Article 21(2) as International Publication No. WO 03/100313, which claims priority of Italian Application No. TO2002 A000437, filed May 23, 2002. Each aforementioned application is hereby incorporated by reference in its entirety.

TECHNICAL FIELD

The present invention relates to a device for balancing an arm pivoting about an axis of rotation, for example, an arm supporting a work station all-purpose fume or gas exhaust conduit.

BACKGROUND ART

In an arm pivoting about an axis of rotation, the torque, with respect to the axis of rotation, due to the weight of the arm and any fixture supported by it, often varies alongside the angular position of the arm about the axis. The arm can be used for various types of equipment, particularly those involving moving the fixture by manually rotating the arm.

To reduce the effort required of the user, the torque due to the weight of the arm is normally balanced by elastic means, such as a contrast spring; and, to compensate the variation in torque produced by a variation in the angular position of the arm, means have been proposed for automatically controlling the action of the spring according to the angular position of the arm.

In an all-purpose fume exhaust conduit, an arm balancing device has been proposed in which the action of the spring is regulated by means fitted to an articulated parallelogram, the pivot of which is eccentric with respect to the axis of rotation of the arm. Though satisfactory in terms of performance, the above balancing device is relatively complex and expensive to produce, on account of the large number of moving parts, and the rods of the parallelogram having to be formed to house the spring inside a substantially closed channel.

DISCLOSURE OF INVENTION

It is an object of the present invention to provide a highly reliable, low-cost device for balancing an arm pivoting about an axis of rotation, and designed to eliminate the aforementioned drawbacks of known balancing devices.

According to the present invention, there is provided a device for balancing an arm pivoting about an axis of rotation, and so located as to vary the torque, due to the weight of said arm and with respect to said axis of rotation, according to the angular position of said arm; said torque being balanced by the contrasting action of elastic means; and control means being provided to control said contrasting action according to said angular position; characterized in that said control means comprise at least one cam member associated with said arm and which acts on said elastic means to control said contrasting action.

BRIEF DESCRIPTION OF THE DRAWINGS

A number of preferred, non-limiting embodiments of the invention will be described by way of example with reference to the accompanying drawings, in which:

FIG. 5 shows a larger-scale, exploded view in perspective of one of the FIG. 4 balancing devices;

FIG. 6 shows a detail of the FIG. 5 device;

FIG. 9 shows an exploded view in perspective of a variation of FIG. 5 balancing device;

FIG. 10 shows a detail of the FIG. 9 device.

BEST MODE FOR CARRYING OUT THE INVENTION

Figure 1:
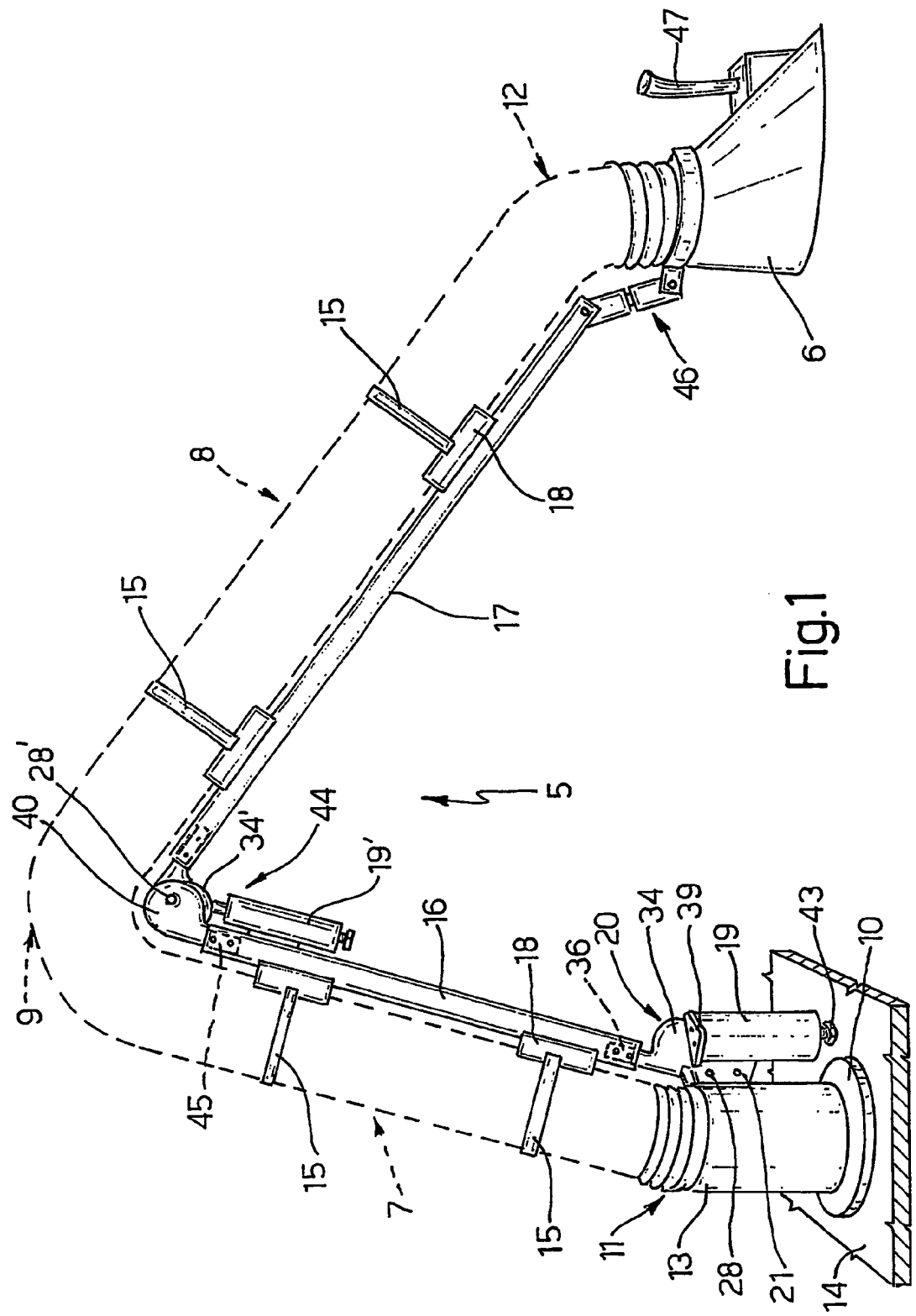
FIG. 1 shows a view in perspective of a work station all-purpose fume or gas exhaust conduit featuring two pivoting arms fitted with respective balancing devices in accordance with a first embodiment of the invention.

Number 5 in FIG. 1 indicates as a whole an all-purpose fume or gas exhaust conduit, e.g. for a work station in a factory or workshop. Conduit 5 preferably has a circular cross section, is fitted at one end with an exhaust hood 6 moved manually over to the fume source, and is defined by two straight portions 7 and 8 connected to each other by a flexible articulated connecting portion 9. Portions 7 and 8 are also connected by another two articulated connected portions 11 and 12 to a rigid portion 13 of conduit 5 and to hood 6 respectively.

Rigid portion 13 rotates inside a sleeve having a flange 10 connecting the sleeve to a fixed support 14 possibly housing an aspirator not shown. More specifically, conduit 5 is defined by a single flexible, e.g. undulated, pipe, the two portions 7 and 8 of which are fixed to two corresponding rigid arms 16 and 17, each defined by a hollow metal section with a rectangular cross section. Straight portions 7 and 8 may be connected, for example, by clamps 15 to corresponding tabs 18 fixed to arms 16 and 17.

Arm 16 is connected to rigid portion 13 by a balancing device indicated as a whole by 20 and for balancing the torque due to the weight of arm 16 together with the weight of conduit 5 as a whole. For which purpose, an appendix 21 of a sleeve 19 is fixed to rigid portion 13, so that sleeve 19 is parallel to rigid portion 13. Sleeve 19 (FIG. 2) comprises a flat bottom wall 22; and a lateral wall 23 having two diametrically opposite axial slots 24 and 26. Appendix 21 is welded at slot 24, outwards of wall 23, and has a C-shaped cross section; and the two wings of appendix 21 are fitted with a pivot 28 defining the axis of rotation of arm 16.

Sleeve 19 is fitted with elastic means for contrasting the torque, with respect to the axis of pivot 28, due to the weight of arm 16 together with the weight of conduit 5 as a whole. The elastic means may be defined by any type of contrast spring, e.g. a compression spring defined by a bar of elastomeric material such as polyurethane, or an air or gas, e.g. nitrogen, spring, which may be in the form of a pneumatic cylinder with a piston for compressing the air or gas inside.

Figures 2, 3:
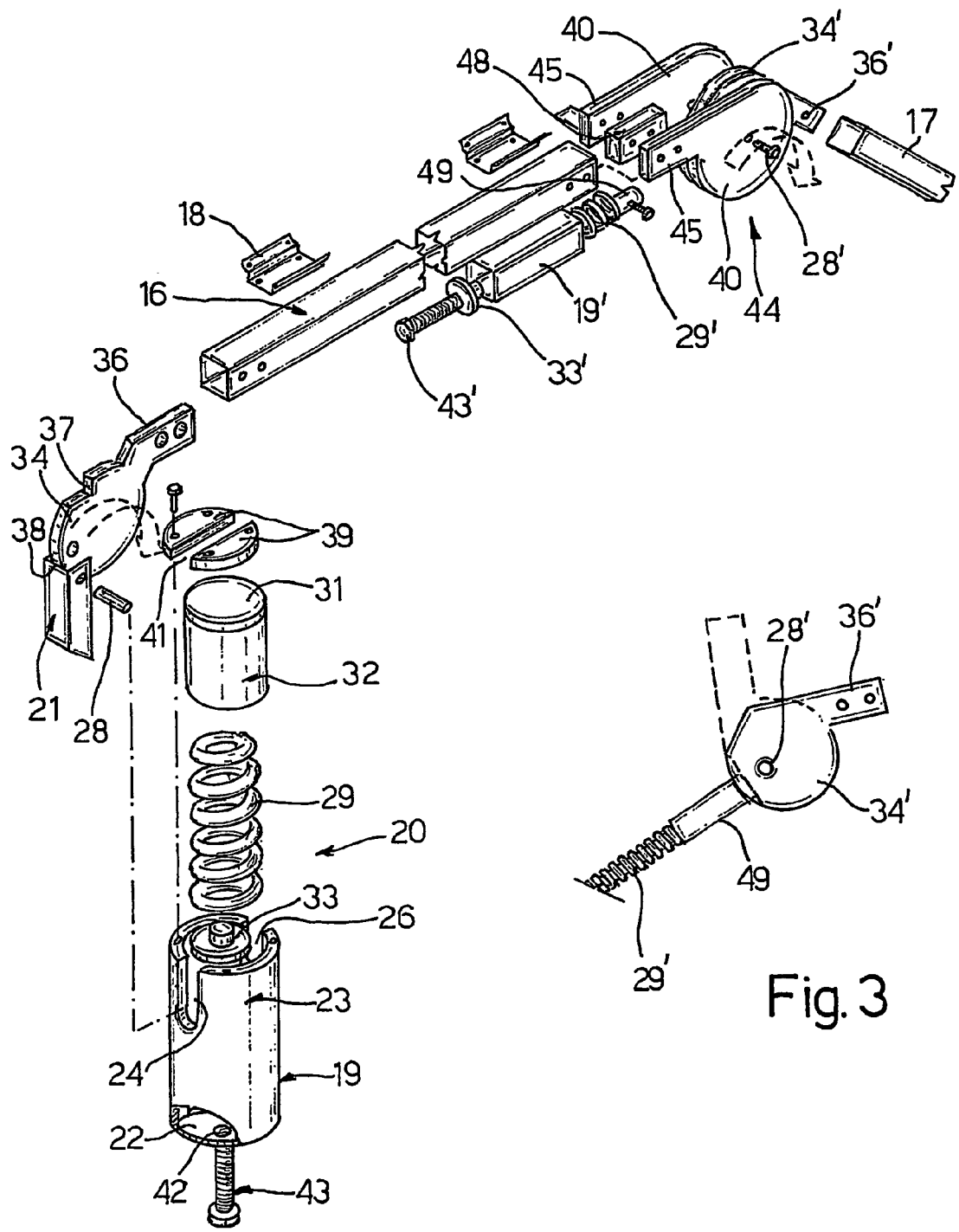
FIG. 2 shows a larger-scale, partial exploded view in perspective of the two arms and respective balancing devices in FIG. 1.
FIG. 3 shows a side view of a detail in FIG. 2.

In the embodiment shown in FIGS. 1 to 3, the contrast spring is defined by a helical compression spring 29 resting at one end on a guide disk 33, and at the other end on a wall 31 closing a container 32 housing spring 29 and itself housed inside sleeve 19.

Arm 16 is connected rigidly to a cam member for controlling the contrasting action of spring 29 according to the angular position of arm 16 about pivot 28. More specifically, the cam member is defined by a cam 34 defined by a profiled disk pivoting eccentrically on pivot 28, and is housed inside the two slots 24 and 26 in sleeve 19. Cam 34 has an appendix 36 fixed rigidly to one end of arm 16, and a shoulder 37 which cooperates with an edge 38 of appendix 21 to define a stop for the travel, anticlockwise in FIG. 2, of cam 34.

The outer profile of cam 34 acts on the convex surface of wall 31 of container 32 to compress spring 29 according to the angular position of cam 34, and therefore of arm 16, with respect to pivot 28. Slot 26 in sleeve 19 allows appendix 36 to rotate to the extent that arm 16 is positioned substantially horizontally. Two substantially semicircular members 39 are fixed, e.g. by screws, to the free edge of sleeve 19 to define a passage 41 for cam 34, and so lock container 32 inside sleeve 19.

Spring 29 is adjusted, i.e. calibrated, to vary the precompression force of the spring by means of an adjusting member. For which purpose, flat wall 22 of sleeve 19 has a threaded hole 42 engaged by an adjusting screw 43 which acts on guide disk 33 of spring 29. The precompression of spring 29 is obviously adjusted before inserting cylinder 32 inside sleeve 19, and is preferably adjusted to balance, at rest, the minimum torque due to the weight of arm 16 and of conduit 5 as a whole.

Arm 17 is connected to arm 16 by a balancing device 44 for balancing the torque due to the weight of arm 17, together with the weight of portion 8 (FIG. 1) of all-purpose conduit 5 and of hood 6. Balancing device 44 is identical to balancing device 20, so the relative component parts are indicated in the drawings using the same reference numbers with superscripts, and are described here only briefly. In balancing device 44, sleeve 19' is fixed directly to the end of arm 16, and cam 34' has an appendix 36' fixed in known manner to the end of arm 17.

Pivot 28' of cam 34' is carried by two circular plates 40, each having a substantially tangential appendix 45; plates 40 are held apart by a spacer block 48 located between appendixes 45 to permit rotation of cam 34'; and appendixes 45 and block 48 are inserted inside and fixed by screws to the end of arm 16, so that pivot 28' of arm 17 is carried by the end of arm 16.

Compression spring 29' is located between disk 33' and a cylindrical block 49 (FIG. 3) held resting on the profile of cam 34'; the other end of arm 17 (FIG. 1) is connected to hood 6 by a universal joint 46; and hood 6 is fitted with a grip 47 by which it is moved manually with respect to support 14.

Each of the two balancing devices 20 and 44 in the FIGS. 1-3 embodiment operates as follows.

Assuming springs 29, 29' of the two balancing devices 20, 44 are calibrated to balance the respective minimum torques of arms 16 and 17, displacement of hood 6 by means of grip 47 both in height and along support 14 varies the angular position of arm 16 and/or arm 17, together with that of relative cams 34, 34', on relative pivots 28, 28', so that cam 34 acts on flat wall 31 of relative container 32 to vary the compression of relative spring 29 according to the angular position of arm 16 with respect to sleeve 19.

Cam 34' in turn acts on block 49 to vary the compression of relative spring 29' according to the angular position of arm 17 with respect to arm 16. In the FIGS. 1-3 embodiment, the action of elastic means 29, 29' is therefore directed radially with respect to the axis of rotation of relative arm 16, 17.

Figure 4:
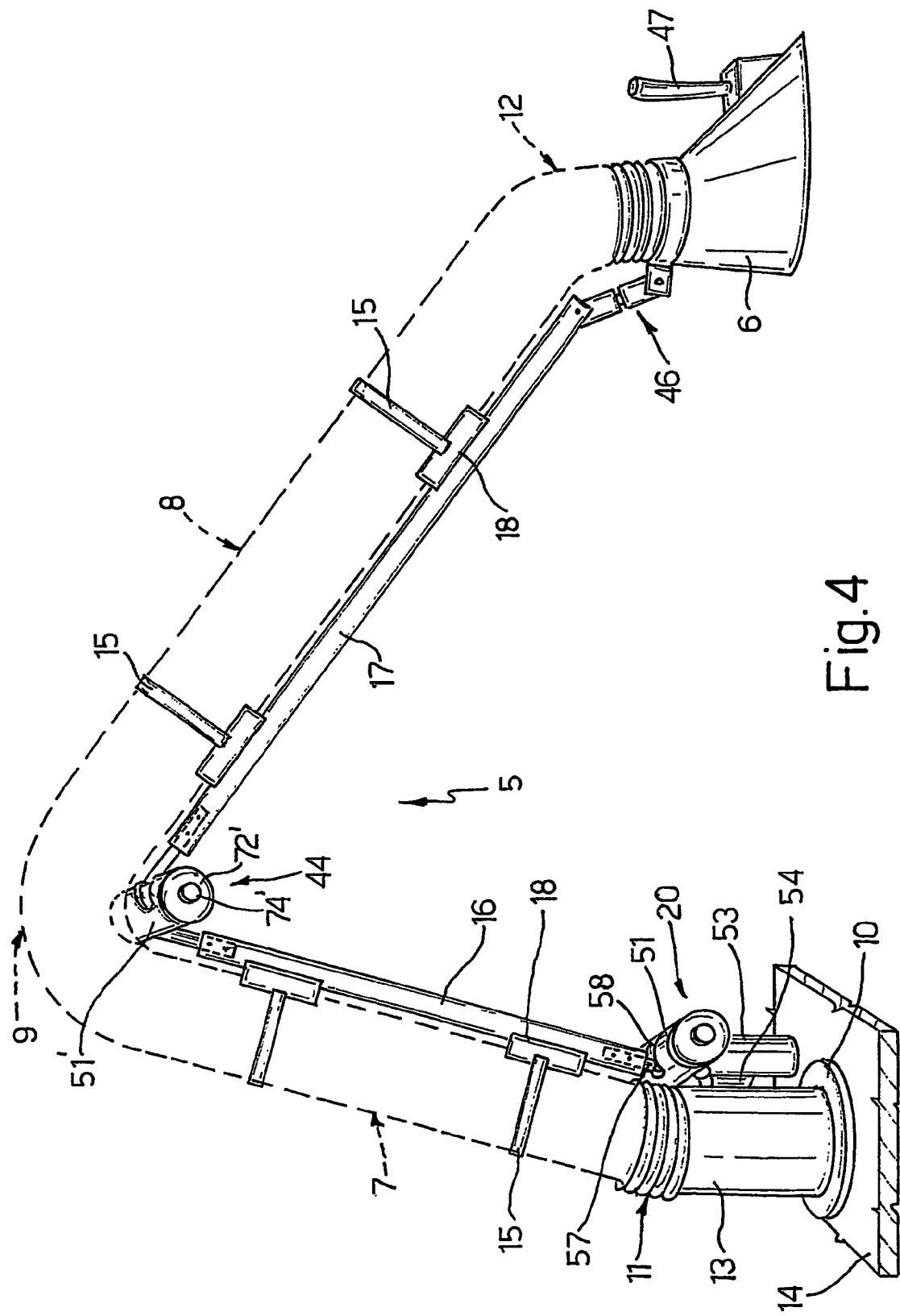
FIG. 4 shows a view in perspective of the FIG. 1 conduit featuring arms fitted with balancing devices in accordance with a further embodiment of the invention.

In the FIG. 4 embodiment, the action of the elastic means of balancing devices 20 and 44 is substantially parallel to the axis of rotation of relative arm 16, 17. More specifically, balancing device 20 of arm 16 comprises an outer sleeve 51 (FIG. 5) having a radial pin 52, which is fixed removably in known manner inside a vertical sleeve 53 having an appendix 54 by which it is fixed to rigid portion 13 (FIG. 4) of conduit 5.

A cylinder 56 is inserted inside sleeve 51, and has another radial pin 57 which is fixed removably in any known manner to one end of arm 16. Pin 57 is located at a circumferential slot 58 in sleeve 51, so that cylinder 56 rotates inside, but is axially fixed with respect to, sleeve 51. The axis of sleeve 51 therefore represents the axis of rotation of arm 16, and sleeve 51 acts as a pivot about which arm 16 rotates.

Cylinder 56 has two symmetrical helical cam edges 59 (see also FIG. 6), each of which cooperates with a complementary edge 61 of a corresponding sleeve 62 having the same diameter as cylinder 56. Each sleeve 62 has an axial slot 63 engaged by a radial pin 64 fixed in known manner to sleeve 51 and directed inwards, so that each sleeve 62 slides axially, but is angularly fixed, with respect to sleeve 51.

Sleeves 62 house respective contrast springs acting axially in opposite directions. More specifically, in the FIGS. 5 and 6 embodiment, each contrast spring is defined by a helical compression spring 66 housed in a corresponding cylindrical container 67 in turn housed inside corresponding sleeve 62. Each container 67 has a flange 68, which rests on a second edge 69 of, and perpendicular to the axis of, corresponding sleeve 62.

Container 67 also has an end wall (not shown), on which one end of spring 66 acts to keep the end wall resting against an end wall of sleeve 62. The other end of spring 66 rests on a guide disk 71, which, together with container 67 and spring 66, is locked inside corresponding sleeve 62 by a cover 72 fixed by screws to an edge 73 of sleeve 51, so that springs 66 are coaxial with sleeve 51.

The member for adjusting or calibrating each spring 66 is defined by a corresponding adjusting screw 74, which engages a threaded hole 76 in cover 72, and acts on disk 71 to adjust the distance between disk 71 and the end wall of container 67, and so adjust the precompression force of spring 66 in the same way as described relative to adjusting screw 43 (FIG. 2).

Figure 7:
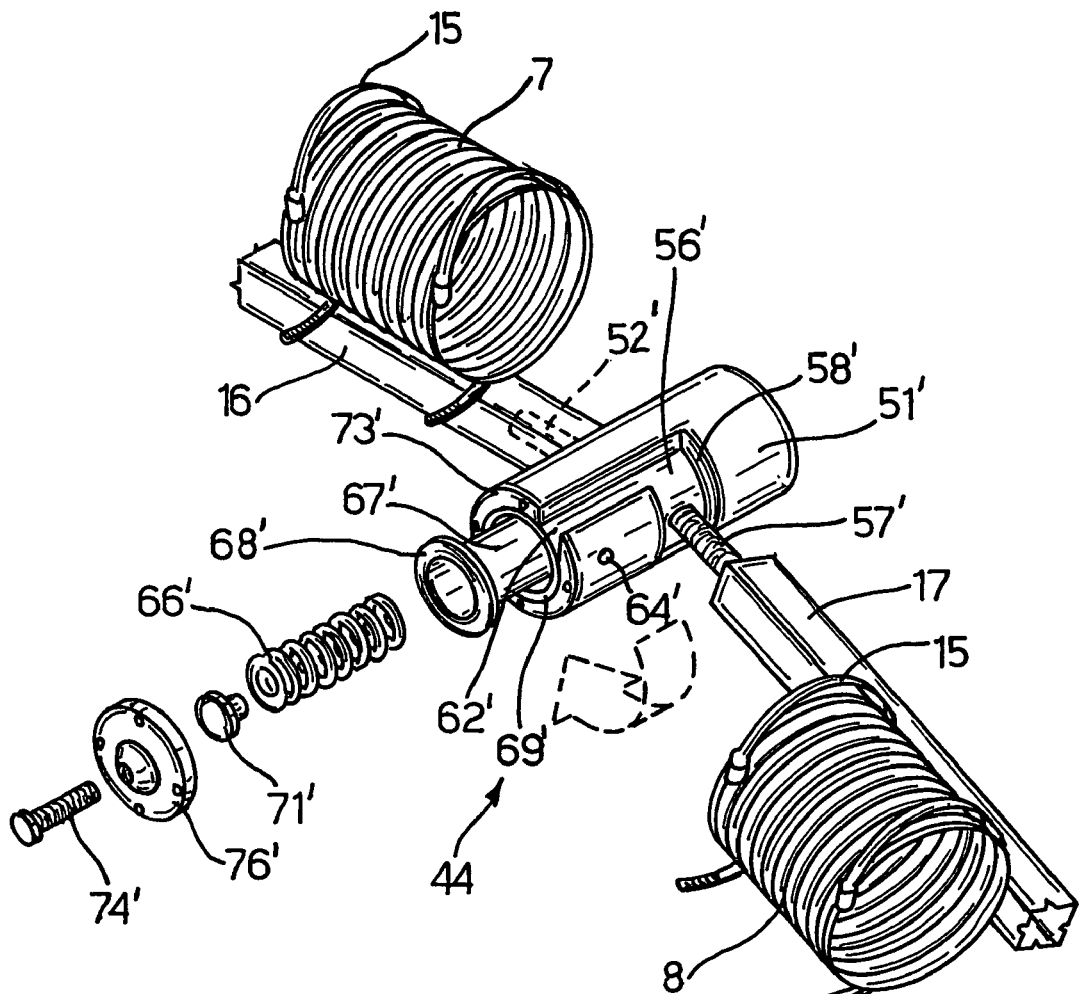
FIG. 7 shows an exploded view in perspective of another of the FIG. 4 balancing devices.
Figure 8:
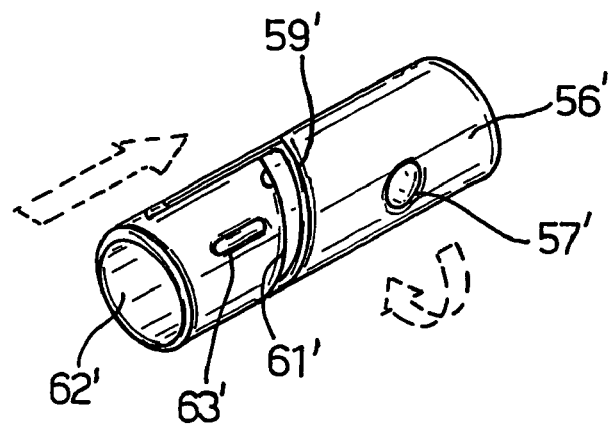
FIG. 8 shows a detail of the FIG. 7 device.

Balancing device 44 between arms 16 and 17 is similar to device 20 in FIG. 5, so the relative component parts are indicated using the same reference numbers with superscripts, and are described here only briefly. Sleeve 51' (FIG. 7) has a radial pin 52' fixed to the end of arm 16, and cylinder 56' has a radial pin 57' fixed to the end of arm 17. In view of the smaller torque to be balanced with respect to device 20, cylinder 56' may advantageously have one cam edge 59' (see also FIG. 8) which cooperates with one sliding sleeve 62'. Provision may therefore be made for one spring 66' housed inside sliding sleeve 62' in the same way as springs 66 in FIG. 5.

Each of balancing devices 20 and 44 in the FIGS. 5-8 embodiment operates as follows.

Assuming springs 66, 66' of the two balancing devices 20, 44 are calibrated to balance the respective minimum torques of arms 16 and 17, springs 66 and 66' normally keep respective flanges 68, 68' of containers 67, 67' resting on edges 69, 69' of respective sleeves 62, 62', and manual displacement of hood 6 both in height and along support 14 varies the angular position of arm 16 and/or arm 17, together with that of relative cylinders 56, 56'.

Cam edges 59 of cylinder 56 of device 20 move the two sleeves 62 axially, and with them containers 67, to vary the compression of relative springs 66 according to the angular position of arm 16 with respect to sleeve 51; and cam edge 59' of cylinder 56' of device 44 in turn axially moves sleeve 62', and with it container 67', to vary the compression of relative spring 66' according to the angular position of arm 17 with respect to arm 16.

In a variation of the balancing device, e.g. the one in FIGS. 5 and 6, the two springs 66 are located axially outside the two sleeves 62 (FIG. 9), in which is inserted a fixed inner sleeve 77. Each end of sleeve 77 is closed by a wall 78 having a threaded hole 79; and each sleeve 62 has a radial pin 82, which engages a corresponding axial slot 81 in inner sleeve 77, so that each sleeve 62 slides axially with respect to, but do not rotate on, inner sleeve 77.

Inner sleeve 77 is fitted with radial pin 52 for connection to vertical sleeve 53 (see also FIG. 4), which engages a radial slot 83 in a cylinder 84, in which sleeve 77 is also inserted. Cylinder 84 therefore rotates with respect to, but does not slide axially on, sleeve 77, has two cam edges 59 cooperating with two complementary edges 61 of the two sleeves 62, and has an appendix 57 by which it is fixed to the end of arm 16, so that arm 16 rotates about the axis of inner sleeve 77.

Each spring 66 is located between two guide disks 87 and 88, each having a central hole. Disk 87 is located outwards, and disk 88 has a flange 89 normally held resting on perpendicular edge 69 of sleeve 62. A long adjusting screw 86 extends through the holes in both disks 87, 88, and engages threaded hole 79 in sleeve 77, so that the precompression of spring 66 is adjusted by adjusting the distance, at rest, between disks 87 and 88.

Operation of the FIGS. 9 and 10 balancing device is identical to that of device 20 in FIGS. 5 and 6, and is therefore not described here. Device 44 with a single spring 66' (FIGS. 7 and 8) may also be designed with spring 66' outside sliding sleeve 62', and with the fixed sleeve inside. Like the device in FIGS. 9 and 10, the cylinder with the cam edge is also located on the outside of the inner sleeve to move sliding sleeve 62' axially.

The advantages, as compared with known devices, of the balancing device according to the invention will be clear from the foregoing description. In particular, the device is extremely compact; springs 29, 29' and 66, 66' are adjusted by cam members 34, 34' and 59, 59', so that the mechanism is cheap and easy to produce; and the precompression of springs 29, 29' and 66, 66' is adjusted easily by means of a straightforward adjusting screw.

Clearly, changes may be made to balancing devices 20, 44 as described herein without, however, departing from the scope of the accompanying claims. For example, the profile of cams 34, 34' may comprise a lift to achieve optimum balance of the torque of arms 16, 17 in each position; and the cam member may be carried by container 32, as opposed to being fixed to arm 16, and be carried by block 49, as opposed to being fixed to arm 17.

Moreover, the helical compression spring 29, 29' may be replaced with an extension spring, which may even be located outside sleeve 19, 19'. In which case, the profile of cam 34, 34' may comprise a groove engaged by a transmission cable connected to one end of the extension spring. Each cam edge 59, 59' may cooperate with a cam-follower member to permit a non-linear edge 59, 59' for optimum balancing of the torque of arms 16, 17 in each position. And arms 16 and 17 may even be balanced by any combination of the balancing devices described above, with a spring acting perpendicular to the axis of rotation of arm 16, 17, as in FIGS. 1 to 3, and with a single spring 66' or pair of springs 66 acting parallel to the axis of rotation.

The straight portions 7 and 8 of conduit 5 may be defined by rigid, smooth pipes; flange 10 of the member supporting rigid portion 13 of conduit 5 may be wall- or ceiling-mounted, as opposed to being fixed to a bottom support 14, which is normally mounted on a trolley; and the balancing device may be applied to any arm supporting fixtures to be moved by hand or motor.

The invention claimed is:

1. A balance assembly comprising:
    a first arm supporting a first portion of a gas exhaust conduit of a workstation;
    a second arm supporting a second portion of the gas exhaust conduit, wherein the first and second arms are arranged to pivot about an axis of rotation;
    a first balancing device comprising:
        a first cam member operatively connected with the first arm;
        a first elastic member having a first side connected to a first fixed element; and
        a first sliding sleeve cooperating with the first elastic member and having a first edge abutting against and sliding over an edge of the first cam member,
    a second balancing device comprising:
        a second cam member operatively connected with the second arm;
        a second elastic member having a first side connected to a second fixed element; and
        a block cooperating with the second elastic member and having a first edge abutting against and sliding over an edge of the second cam member,
    wherein the first and second cams are calibrated to balance the first and second arms in respective minimum torque angular positions, and
    wherein the first cam acts on the first sliding sleeve to vary compression of the first elastic member according to an angular position of the first arm with respect to the first sliding sleeve, and wherein the second cam acts on the block to vary compression of the second elastic member according to an angular position of the second arm with respect to the first arm.

2. A device as claimed in claim 1, wherein said first or second elastic member comprises at least one bar of elastomeric material.

3. A device as claimed in claim 1, wherein said first or second elastic member comprises at least one air or gas spring.

4. A device as claimed in claim 1, wherein said first or second elastic member comprises at least one helical spring.

5. A device as claimed in claim 1, wherein said first or second elastic member is housed in a cylindrical container sliding inside said first or second sliding sleeve supporting said axis of rotation;
    said first or second_cam member being integral with a respective one of said first or second arm.

6. A device as claimed in claim 1, wherein the action of said first elastic member is substantially perpendicular to said axis of rotation;
    said first cam member being a cam in the form of a disk rotating about said axis of rotation.

7. A device as claimed in claim 4, wherein said at least one helical spring is a compression spring having another end cooperating with a guide disk;
    said compression spring being calibrated.

8. A device as claimed in claim 5, wherein said compression spring has one end resting against a closing wall of said container;
    said closing wall cooperating with said first cam.

9. A device as claimed in claim 1 wherein said first or second elastic member produces a contrasting action of compression.

* * * * *